(12) United States Patent
Shaji et al.

(10) Patent No.: US 12,086,115 B1
(45) Date of Patent: Sep. 10, 2024

(54) AUTOMATED DATA RETRIEVAL AND PROVIDING ALERTS FOR OUTDATED DATA

(71) Applicant: Amazon Technologies, Inc., Seattle, WA (US)

(72) Inventors: Shibu Shaji, Woodinville, WA (US); Hima Priya Reddyvari, Renton, WA (US); Asim Poudel, Renton, WA (US); Alokkumar Khagendra Roy, Aldie, VA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 17/853,519

(22) Filed: Jun. 29, 2022

(51) Int. Cl.
G06F 16/00 (2019.01)
G06F 11/07 (2006.01)
G06F 11/34 (2006.01)
G06F 16/215 (2019.01)
G06F 16/23 (2019.01)

(52) U.S. Cl.
CPC ........ *G06F 16/215* (2019.01); *G06F 11/0784* (2013.01); *G06F 11/3419* (2013.01); *G06F 16/2358* (2019.01)

(58) Field of Classification Search
CPC ............. G06F 1/3293; G06F 16/24539; G06F 11/3419; G06F 16/2393; G06F 16/2453; G06F 16/24542; G06F 7/14; G06F 11/1076; G06F 11/1446; G06F 11/2071; G06F 11/3034; G06F 11/3058; G06F 11/3409; G06F 11/3466; G06F 12/0246; G06F 16/29; G06F 2212/1032; G06F 2212/7205; G06F 2212/7208; G06F 2212/7211; G06F 3/04845; G06F 3/0614; G06F 3/0631; G06F 3/0659; G06F 3/0679; G06F 3/0688; G06T 1/20; G06T 15/005; G06T 2200/04; G06T 2210/36; G09G 2360/06; G09G 2360/08; G09G 5/363

See application file for complete search history.

(56) References Cited

U.S. PATENT DOCUMENTS

| | | | |
|---|---|---|---|
| 2010/0122311 A1* | 5/2010 | Rodriguez | H04N 19/587 375/240.25 |
| 2015/0177822 A1* | 6/2015 | Shoshan | G06T 15/005 345/522 |
| 2017/0371074 A1* | 12/2017 | Elkabetz | G01W 1/14 |
| 2022/0329984 A1* | 10/2022 | Wang | H04W 72/30 |

* cited by examiner

*Primary Examiner* — Shyue Jiunn Hwa
(74) *Attorney, Agent, or Firm* — Lee & Hayes, P.C.

(57) ABSTRACT

This disclosure describes a data dependency and monitoring service that includes a database module (data dictionary) that contains information about database entities, for example, reports, tables, views, dashboards, etc. The information may include, for example, description, ownership, location, refresh cadence, etc. The data dependency and monitoring system provides a data dependency module that lists upstream data sources behind the data entities and also illustrates other entities and table dashboards that use the data entities downstream. The data dependency monitoring system provides a data monitoring and alert module that triggers alerts when data within a data entity is not refreshed by a predefined refresh cadence, e.g., a predetermined amount of time, thereby causing the corresponding data to be stale or out of date.

20 Claims, 17 Drawing Sheets

| ENTITY DETAILS 302 | COLUMN DETAILS 304 | DOWNSTREAM DEPENDENCY 306 | UPSTREAM DEPENDENCY 308 | DASHBOARD DEPENDENCY 310 | SQL 312 |
|---|---|---|---|---|---|

| COLUMN NAME 502 | DATA TYPE 504 | COLUMN DESCRIPTION 506 |
|---|---|---|
| REGION | CHARACTER VARYING | DESCRIPTION OF REGION |
| CLUSTER | DATE | DESCRIPTION OF CLUSTER |
| ▪ | ▪ | ▪ |
| ▪ | ▪ | ▪ |
| ▪ | ▪ | ▪ |
| CORE_FABRIC | DATE | DESCRIPTION OF CORE FABRIC |

| Show 25 ↘224 | | | Search Records ↘220 | | | Bulk Update ↘222 | |
|---|---|---|---|---|---|---|---|

| Database 202 | Schema 204 | Entity 206 | Type 208 | Owner 210 | Status 212 | Description 214 | Last Updated By 216 | Last Updated Date 218 |
|---|---|---|---|---|---|---|---|---|
| AADPB | SXTP | A_BRICK_LIST_WEEKLY | Internal Table | JSMITH | Active | Stuff | JSMITH | 2022-01-10 10:33:44 |
| AADPB | XTP | A_CLUSTER_REGION | Internal Table | JSMITH | Active | More Stuff | JSMITH | 2022-02-10 23:15:27 |
| AADPB | TRRP_SQUARE | A_XTCD_MAPPING | Internal Table | RJONES | Active | Some Stuff | JSMITH | 2022-03-01 08:57:44 |
| ... | ... | ... | ... | ... | ... | ... | ... | ... |
| AADPB | SXTP | A_MDL_BRK_WEEKLY | External Table | TJONES | Active | More Stuff | JSMITH | 2022-01-10 10:33:44 |

FIG. 2

| ENTITY DETAILS 302 | COLUMN DETAILS 304 | DOWNSTREAM DEPENDENCY 306 | UPSTREAM DEPENDENCY 308 | DASHBOARD DEPENDENCY 310 | SQL 312 |
|---|---|---|---|---|---|

| ENTITY DETAILS 302 | COLUMN DETAILS 304 | DOWNSTREAM DEPENDENCY 306 | UPSTREAM DEPENDENCY 308 | DASHBOARD DEPENDENCY 310 | SQL 312 |
|---|---|---|---|---|---|

ENTITY ID 402 xx_32456

TYPE 404

INTERNAL TABLE

CREATED BY 406

JSMITH

LOCATION 408

SOMEWHERE

LAST UPDATE BY 410

JSMITH

LAST UPDATE ON 412

XPPQRT_322

FRESHNESS STATUS 414

DELAYED

STATUS 416

ACTIVE

ENTITY OWNER 418

JSMITH

LAST REFRESH COLUMN 420

SNAPSHOT_DAY

ENTITY DESCRIPTION 422

STUFF

REFRESH START DATE 424

04/12/2022, 23:00:00

REFRESH INTERVAL 426

1

REFRESH INTERVAL TYPE 428

WEEKS

OFFSET DAYS 430

0

ALERT BUFFER (IN HOURS) 432

2

REFRESH TIME (UTC) 434

| ENTITY DETAILS 302 | COLUMN DETAILS 304 | DOWNSTREAM DEPENDENCY 306 | UPSTREAM DEPENDENCY 308 | DASHBOARD DEPENDENCY 310 | SQL 312 |
|---|---|---|---|---|---|
| | COLUMN NAME 502 | DATA TYPE 504 | | COLUMN DESCRIPTION 506 | |
| | REGION | CHARACTER VARYING | | DESCRIPTION OF REGION | |
| | CLUSTER | DATE | | DESCRIPTION OF CLUSTER | |
| | ... | ... | | ... | |
| | CORE_FABRIC | DATE | | DESCRIPTION OF CORE FABRIC | |

FIG. 5

| ENTITY DETAILS 302 | COLUMN DETAILS 304 | DOWNSTREAM DEPENDENCY 306 | UPSTREAM DEPENDENCY 308 | DASHBOARD DEPENDENCY 310 | SQL 312 |
|---|---|---|---|---|---|

SEARCH RECORDS — 610

| HIERARCHY LEVEL 612 | ENTITY NAME 602 | ENTITY STATUS 604 | REFRESH STATUS 606 | OWNER 608 |
|---|---|---|---|---|
| LEVEL 1 | ENTITY B | ACTIVE | CURRENT | JSMITH |
| LEVEL 1 | ENTITY C | ACTIVE | CURRENT | JSMITH |
| LEVEL 1 | ENTITY D | ACTIVE | DELAYED | RJONES |
| LEVEL 1 | ENTITY E | ACTIVE | DELAYED | RJONES |
| LEVEL 2 | ENTITY F | ACTIVE | DELAYED | RJONES |
| LEVEL 2 | ENTITY G | ACTIVE | DELAYED | RJONES |
| LEVEL 2 | ENTITY H | ACTIVE | CURRENT | TJONES |

FIG. 6

| Entity Details 302 | Column Details 304 | Downstream Dependency 306 | Upstream Dependency 308 | Dashboard Dependency 310 | SQL 312 |
|---|---|---|---|---|---|

Search Records — 710

| Hierarchy Level 712 | Entity Name 702 | Entity Status 704 | Refresh Status 706 | Owner 708 |
|---|---|---|---|---|
| Level 1 | Entity B | Active | Current | JSmith |
| Level 1 | Entity C | Active | Current | JSmith |
| Level 1 | Entity D | Active | Delayed | RJones |
| Level 2 | Entity E | Active | Delayed | RJones |
| Level 2 | Entity A | Active | Refreshed | TJones |
| Level 3 | Entity X | Active | Delayed | RJones |
| Level 3 | Entity Y | Active | Current | TJones |

FIG. 7

| ENTITY DETAILS 302 | COLUMN DETAILS 304 | DOWNSTREAM DEPENDENCY 306 | UPSTREAM DEPENDENCY 308 | DASHBOARD DEPENDENCY 310 | SQL 312 |
|---|---|---|---|---|---|

SEARCH RECORDS — 814

| DASHBOARD NAME 802 | ENVIRONMENT 804 | STATUS 806 | PRIMARY OWNER 808A | BUSINESS OWNER 808B | DESCRIPTION 810 | LINK 812 |
|---|---|---|---|---|---|---|
| GOOD STUFF | FUN GROUP | ACTIVE | JSMITH | | RELATED TO GOOD THINGS FOR THE FUN GROUP | HTTPS://WWW.XXX.AAA.COM |

FIG. 8

| Entity Details 302 | Column Details 304 | Downstream Dependency 306 | Upstream Dependency 308 | Dashboard Dependency 310 | SQL 312 |
|---|---|---|---|---|---|
| With<br><br>dim Fabrics as<br>(<br>Select Distinct core_fabric, fabric service<br>From lrp_tools.s_btd_demand_wow<br>Union<br>Select Distinct core_fabric, service<br>From lrp_tools.d_btd_rack_landings_wow<br>)<br>,dimAZ as<br>(<br>Select Distinct GEO.region, WD.cluster, WD.az<br>Inner Join dccp.dim_geographies GEO On<br>WD.cluster = GOE On<br>Where Geo.region Is Not Null<br>)<br>,dimHorizons as<br>(<br>Select distinct snapshot_day, stm_date From lrp_tools.d_btd_demand_wow<br>)<br>, dimStartDates as<br>(<br>Select Distinct start_date as landings_start_date From lrp_tools.d_btd_rack_landings_wow<br>) | | | | | |

DASHBOARD DETAILS 1102

DEPENDENCY 1104

SQL 1106

DASHBOARD ID 1202: xx_354638

PATH 1204: PROJECT FOLDER

TYPE 1206: TABLE SERVICE

CREATED ON 1208: 04/12/2022, 23:00:00

TECH OWNER 1210: JSMITH

LINK 1212: HTTPS://WWW.XXX.AAA.COM

LAST UPDATE ON 1214: 05/12/2022, 11:00:00

LAST UPDATE BY 1216: JSMITH

AUTOMATED DATA RETRIEVAL AND PROVIDING ALERTS FOR OUTDATED DATA

BACKGROUND

Service providers offer cloud-based services via service provider networks to fulfill user's computing-service needs without the users having to invest in and maintain computing infrastructure required to implement the services. These service providers may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

Data engineers own an enormous amount of data sets from different databases and/or data sources within a service provider network. The data sets may include, for example, tens of thousands of tables with multiple entries. Additionally, the data sets may include thousands of users that provide the data and/or use the data. Furthermore, there are many, many sources of data. This results in several thousands of reports, downstream tables, dashboards, etc. using the data.

Currently, it is often not known what data is located where within the different databases and/or data sources within the service provider network, e.g., what and where the data is in data clusters. Users want to know if particular data is located in the service provider network. Currently, there is no way identify what data is contained within the service provider network, where the data is located within the service provider network, and who the upstream sources of data and the downstream consumers of the data are.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 schematically illustrates an example of a user interface (UI) 20 that may be accessed by a user and/or an owner using a computing device 130 accessing the database and obtaining and/or updating various pieces of information for various data entries within the database.

FIG. 3 schematically illustrates interactive tabs (UIs) that may be displayed when an entity is selected by interacting with user interface.

FIG. 4 schematically illustrates examples of information that may be displayed by selecting the entity details UI of FIG. 3.

FIG. 5 schematically illustrates examples of information that may be displayed by selecting the column details UI of FIG. 3.

FIG. 6 schematically illustrates examples of information that may be displayed by selecting the downstream dependency UI of FIG. 3.

FIG. 7 schematically illustrates examples of information that may be displayed by selecting the upstream dependency UI of FIG. 3.

FIG. 8 schematically illustrates examples of information that may be displayed by selecting the dashboard dependency UI of FIG. 3.

FIG. 9 schematically illustrates examples of information that may be displayed by selecting the SQL UI of FIG. 3.

FIG. 12 schematically illustrates examples of information that may be displayed by selecting the dashboard details UI of FIG. 11.

DETAILED DESCRIPTION

Figure 1:
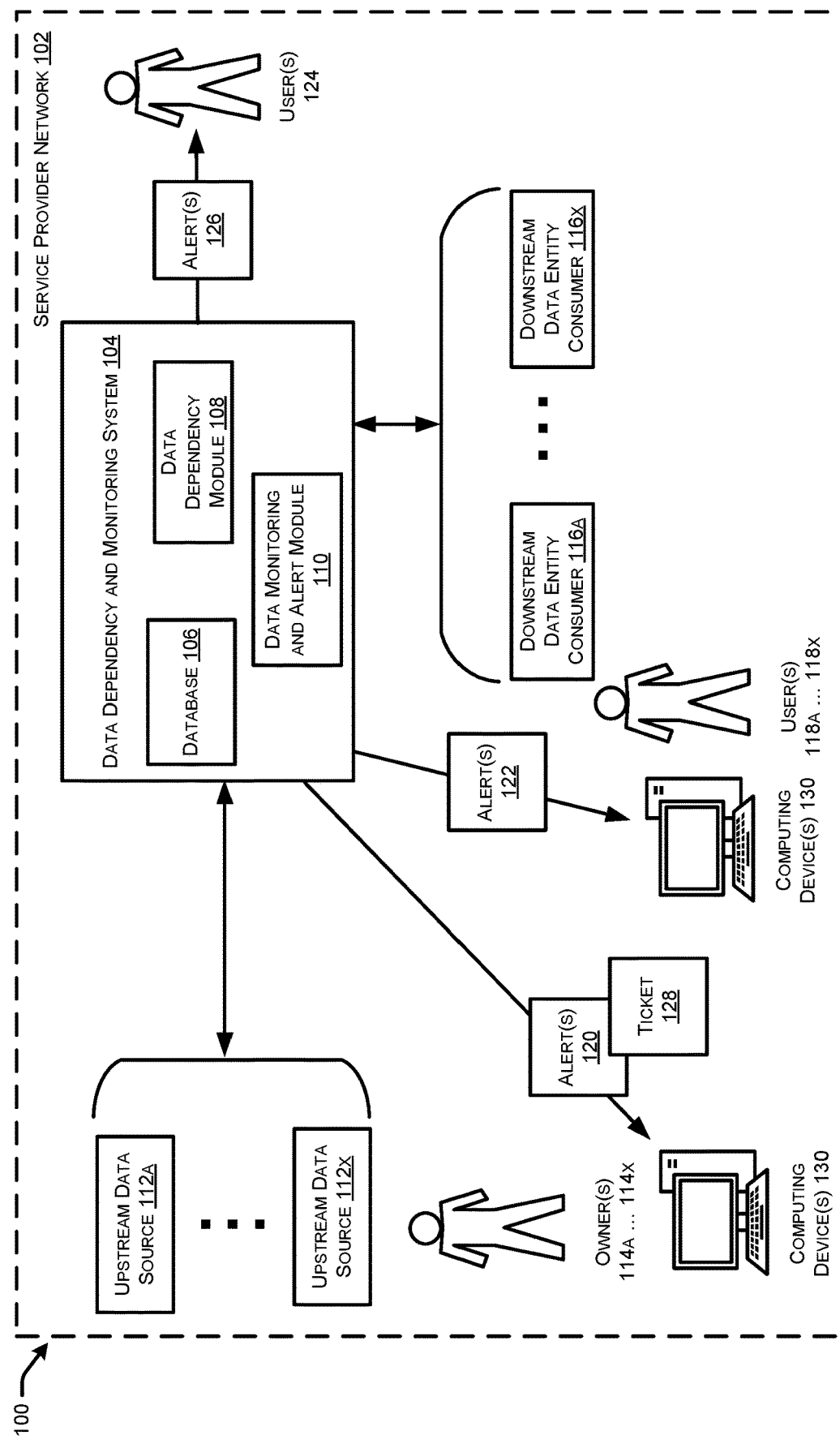
FIG. 1 schematically illustrates a system-architecture diagram of an example environment 100 that includes an example service provider network.

This disclosure describes, at least in part, techniques and architecture that provide a database dependency and monitoring system for a network, e.g., a service provider network (although the techniques and architecture are applicable to other types of networks). The data dependency and monitoring system described herein is a tool that illustrates how data flows and interacts with various systems in a data ecosystem.

In configurations, the data dependency and monitoring system illustrates mapping of data dependencies that closes the gap between data models, ensuring that the mapping of data dependencies is accurate and accessible for decision makers to analyze the data. The data dependency and monitoring system not only helps users better understand their data, but the data dependency and monitoring system also allows users to monitor the data freshness and alerts such that data owners are able to make more informed decisions.

With the help of the data dependency and monitoring system described herein, data owners may be aware of implications on downstream systems when data owners are changing code at source as the data dependency and monitoring system shows all the depending downstream systems that might develop issues due to the changes. The data dependency and monitoring system also gives users clear visibility and helps in identifying the root causes of application disruptions, thus saving time and effort in debugging. The data dependency and monitoring system may help determine possible failure points that might put a business at risk.

Thus, as the sheer volume of data sources increases, data mapping is more complex than ever, but with the data dependency and monitoring system described herein, data owners may have a complete view of the data infrastructure and may feel more confident about the data quality in the data warehouse. With the data dependency and monitoring system described herein, users may track how each component works with other components, thus helping teams design better data models and tools, which also helps ensure that the data is accurate before the data reaches the end user.

In particular, the techniques and architecture provide a data dependency and monitoring service that includes a database module (data dictionary) that contains information about database entities, for example, reports, tables, views, dashboards, etc. The information may include, for example, description, ownership, location, refresh cadence, etc. The data dependency and monitoring system provides a data dependency module that lists upstream data sources behind the data entities and also illustrates other entities and table dashboards that use the data entities downstream. The data dependency monitoring system provides a data monitoring and alert module that triggers alerts when data within a data entity is not refreshed by a predefined refresh cadence, e.g., a predetermined amount of time, thereby causing the corresponding data to be stale, out of date, invalid, etc.

In configurations, the alert is sent to the stale data entity owner as well as downstream object owners (tables, views, dashboards, etc.) who depend on the stale (outdated) data set. Thus, the data dependency and monitoring system described herein adds information regarding what the sources of data are in the database, e.g., where is the data coming from upstream. Additionally, whether the source of data is correct and whether the data is up to date. As used herein, owner and ownership refer to an individual and/or group that is responsible for and has control of a data entity, downstream object, etc.

For example, the data dependency monitoring system builds a database (data dictionary) of what data is owned within a network. The information may include information about each database within the network such as, description, ownership, location, refresh cadence, etc. The data dependency and monitoring system also automatically determines the sources of each of the data sets in the database. Furthermore, the data dependency and monitoring system determines how the data is populated into the reports, tables, views, dashboards, etc.

A hierarchal database may be built where levels are included within the hierarchal database to indicate various dependencies of the data. The owners of the upstream sources of data are also identified. It is also determined when the data is supposed to be uploaded or provided to the database, e.g., a refresh cadence, by the owners of the upstream data source.

For example, if data is supposed to be updated/refreshed by 7:00 a.m. daily, then if the data is not refreshed/updated by 7:00 a.m. on a particular day, the data may be labeled as stale, e.g., not up to date, etc. In configurations, there may be a threshold of, for example, 1 to 2 hours. Thus, the data may not be labeled as stale until 9:00 a.m., thereby giving the owner of the data source a window in which to refresh/update the data after it is due. In configurations, the threshold is defined by the owner of the data source.

Once the data is labeled as stale or out of date, the owner of the upstream source of data receives an alert of the problem. Also, downstream consumers of the data, e.g., reports, tables, views, dashboards, etc. who depend on the data may receive an alert. The alerts may be provided to groups or individuals depending on ownership of the upstream data sources and/or downstream consumers of the data.

In configurations, the upstream data source may have a second upstream data source on which the upstream data source relies for updating its own data. If the second upstream data source is late in providing data to the upstream data source, thereby causing the upstream data source to be stale, then the owner of the second upstream data source may receive an alert that the second upstream data source is late, e.g., out of date, stale, invalid, etc. In configurations, the alert may not be sent to the second upstream data source until after a predetermined threshold.

Additionally, the data dependency and monitoring system described herein provides various dashboards to allow for viewing of data and the status of the data. For example, the dashboards may display the hierarchy illustrating the various levels of dependency for various data entities. The dashboards may also illustrate which data entities are up to date, e.g., the status of the data. Furthermore, updates may be provided to owners and authorized users of the dashboards.

In configurations, the data dependency and monitoring system may identify data entities that are permanently stale and deprecate and/or delete such stale data entities. Downstream consumers of data entities may search and/or request whether any of the data upon which they rely is invalid.

In configurations, the data may be automatically obtained by an extract, transform, load (ETL) platform and put into tables in the database (data dictionary). The data dependency and monitoring system generally uses data that is included within a particular network. The data may be provided by entities within the network or may be provided by an external entity to an entity within the network. Thus, the data is owned by the network. In configurations, permissions and security requirements may be met with respect to external entities and the data may be automatically obtained from the external entities (upstream sources) outside of the network using an ETL platform.

When a data entity and/or data source is stale, in configurations when the alert is sent, a ticket may be provided to the owner of the data source, e.g., a ticket to update the data. In configurations, alerts may be sent periodically until the data is refreshed or updated. However, in configurations, additional tickets may not be provided to avoid the necessity of the owner to clear multiple tickets for one problem.

For example, subsequent alerts may be sent every hour, but the original ticket with the original alert may be the only ticket issued. However, if desired, multiple tickets may be sent until the data is refreshed or updated. Furthermore, in configurations, downstream consumers of the data may request further alerts be sent to upstream owners of data, e.g., upstream sources of data. Additionally, based on the data entity and/or data source not being available, periodic attempts may be made to obtain the current data for the data entity and/or data source.

In configurations, subscription-based alerting may be provided. Thus, an owner of an upstream data source may receive an alert. However, another party or entity, e.g., a supervisor of the owner, may subscribe to receive alerts to indicate to the supervisor that the data source is not up to date.

Additionally, in configurations, permissions may be provided to parties for accessing dashboards, report, tables, etc. The permissions may be automatically granted based upon the relationship of the party to another party that has permission to access the dashboard, report, table, etc. For example, if party A has permission to access a particular dashboard, report, table, etc., and party B wishes permission to access the particular dashboard, report, table, etc., it may be determined that party B deserves or may be allowed to have access to the particular dashboard, report, table, etc., based upon party B's association and/or relationship with party A. Thus, in configurations, an algorithm, e.g., machine learning, may be utilized to determine such permissions.

The techniques described herein may be performed by a system and/or device having non-transitory computer-readable media storing computer-executable instructions that, when executed by one or more processors, performs the method(s) described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a system-architecture diagram of an example environment 100 that includes an example service provider network 102, although the example environment 100 may include a different type of network. The service provider network 102 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 102 may be distributed across one or more physical or virtual devices.

As may be seen in FIG. 1, the service provider network 102 includes a data dependency and monitoring service 104. The data dependency and monitoring service 104 includes a database 106 (data dictionary), a data dependency module 108, and a data monitoring and alert module 110.

The service provider network 102 also includes one or more upstream data sources 112a, . . . , 112x (referred to generically and/or collectively herein as upstream data sources 112), which are owned by one or more owners 114a, . . . , 114x (referred to generically and/or collectively herein as owners 114). Each owner 114 may own multiple upstream data sources 112. The one or more upstream data sources 112 and/or one or more owners 114 may be part of the service provider network 102 or may be external to the service provider network 102. Each owner 114 may access the service provider network 102 using a computing device 130.

The service provider network 102 also includes one or more downstream data entity consumers 116a, . . . , 116x (referred to generically and/or collectively herein as downstream data entity consumers 116), which may be in the form of individuals or groups. Additionally, one or more of the downstream data entity consumers may be in the form of a report, table, view, dashboard, etc., that may be owned and/or used by one or more users 118a, . . . , 118x (referred to generically and/or collectively herein as users 118). Each user 118 may access the service provider network 102 using a computing device 130. In configurations, one or more users 118 may also be an owner 114.

The one or more downstream data entity consumers 116 and/or users 118 may be part of the service provider network 102 or may be external to the service provider network 102. Additionally, alerts 120 may be provided to owners 114, as will be described further herein. Alerts may also be provided to users 118, as will be described further herein. Users 124 may subscribe to receive alerts 126, as will be described further herein. Downstream data entity consumers 116 may also be upstream data sources 112.

The data dependency monitoring system 104 builds the database 106 (data dictionary) of what data is owned within the service provider network 102. The information may include information about other databases within the service provider network 102 such as, description, ownership, location, refresh cadence, etc. For example, the database 106 may serve as a repository for all data entities in the service provider network 102. The database 106 may provide users 118 and/or owners 114 valuable information on what data is available in the service provider network 102, where the data is located, how frequently the data is updated, etc. The database may also help new users 118 to onboard quickly and more efficiently. As used herein, own, owner, ownership, etc., refer to an individual and/or group that is responsible for and has control of a data entity, downstream object, data, etc.

In configurations, the data dependency and monitoring system 104 builds the database 106 with the data dependency module 108 as a hierarchal database where levels are included within the hierarchal database to indicate various dependencies of the data. The data dependency module 108 lists upstream data sources 112 behind the data entities within the database 106 and also illustrates other entities and dashboards that use the data entities downstream, e.g., the data entity consumers 116. The owners 114 of the upstream data sources 112 may also be also identified.

The data dependency module also determines when the data is supposed to be uploaded or provided to the database, e.g., a refresh cadence, by the corresponding owner 114 of an upstream data source 112. The data monitoring and alert module 110 monitors the database 106 to determine if the refresh cadence for data entries has been met. For example, if data is supposed to be updated/refreshed at upstream data source 112a by 7:00 a.m. daily, then if the data is not refreshed/updated by 7:00 a.m. on a particular day at upstream data source 112a, the data may be labeled as stale, e.g., not up to date, etc. In configurations, there may be a threshold of, for example, 1 to 2 hours. Thus, the data may not be labeled as stale until 9:00 a.m., thereby giving the owner 114a of the upstream data source 112a a window in which to refresh/update the data after it is due. In configurations, the threshold is defined by the owner 114a of the upstream data source 114a. Thus, in configurations, the data monitoring and alert module 110 monitors the "freshness" of the data.

In configurations, the upstream data source 112a may have an upstream data source, e.g., upstream data source 112x, on which upstream data source 112a relies for updating its data. If upstream data source 112x is late in providing data to upstream data source 112a, thereby causing upstream data source 112a to be stale, then the owner, e.g., owner 112x, may receive an alert 120 that upstream data source 112x is late, e.g., out of date or stale. In configurations, the alert may not be sent to upstream data source 112x until after a predetermined threshold.

Once the data is labeled as stale or out of date, the owner 114a of the upstream data source 112a may receive an alert 120 of the problem from the data monitoring and alert module 110. Also, users 118 who have downstream data entity consumers 116 of the data, e.g., reports, tables, views, dashboards, etc. and thus depend on the data may receive an alert 122 from the data monitoring and alert module 110 indicating that the data is not available, e.g., the data is out of date, stale, invalid, etc. The alerts 120, 122 may be provided to groups or individuals depending on ownership of the upstream data sources 112 and/or downstream data entity consumers 116. In configurations, the data dependency and monitoring system 104, e.g., the data monitoring and alert module 110, may identify data entities, e.g., upstream data sources 112, that are permanently stale and deprecate and/or delete such stale data entities. Downstream data entity consumers 116 may search and/or request whether any of the data upon which they rely is invalid.

When a data entity, e.g., the upstream data source 112a, is stale, in configurations when the alert 102 is sent to the owner 114a, a ticket 128 may be provided to the owner of the data source, e.g., a ticket to update the data. In configurations, alerts 120 may be sent periodically until the stale data is refreshed or updated.

However, in configurations, additional tickets 128 may not be provided to avoid the necessity of the owner 114a needing to clear multiple tickets 128 for the same problem. For example, subsequent alerts 120 may be sent every hour, but the original ticket 128 sent with the original alert 120 may be the only ticket 128 issued. However, if desired, multiple tickets 128 may be sent until the data is refreshed or updated. Furthermore, in configurations, users 118, e.g., corresponding users 118 of downstream data entity consumers 116 that rely on upstream data source 112a, may request further alerts 120 be sent to owner 114a. Additionally, based on the data entity being stale, periodic attempts may be made to obtain the current data for the data entity.

In configurations, subscription-based alerting may be provided. In the current example, when owner 114a of upstream data source 112a receive the alert 120 that data from upstream data source 112a is stale, a subscriber 124, e.g., a supervisor of the owner 114a, may subscribe to receive alerts 126 to indicate to the subscriber 124 that the data from the upstream data source 112a is not up to date.

The data dependency and monitoring service 104 provides reduced processor cycles and power requirements by automatically maintaining accurate records of data "freshness," e.g., accurateness. Users are automatically kept apprised of the freshness of data on which the users rely for various reports and projects. This reduces the time and need for computing resources for the users to ascertain on their own about the freshness of data. Furthermore, owners of data are kept apprised of the freshness of data for which the owners are responsible, thereby reducing the time and need for computing resources by owners in order to maintain the freshness of their data.

As an example, party A maintains a report within which party A uses data provided by party B, e.g., party A is a downstream data entity consumer 118 of data provided by party B, an upstream data source 112 for party A. By automatically informing party A that data from party B is out of date, e.g., not refreshed, party A is aware that party A's report is no longer accurate and thus, party A does not need to spend time and computing resources to determine the accuracy of party A's report.

Likewise, by automatically informing party B that party B's data is out of date, e.g., late with respect to refreshing, party B does not need to spend time and computing resources to determine the freshness of party B's data. Furthermore, if party B's data is out dated due to party B needing data from party C, party B is automatically informed with respect to the situation and does not need spend time and computing resources to determine the reason party B's data is out of date.

FIG. 2 schematically illustrates an example of a user interface (UI) 200 that may be accessed by a user 118 and/or an owner 114 using a computing device 130 for accessing the database 106 and obtaining and/or updating various pieces of information for various data entries related to data entities within the database 106. As may be seen in FIG. 2, examples of information may include database 202, schema 204, entity 206, type 208, owner 210, status 212, description 214, "last updated by" 216, and "last update date" 218.

Database 202 may indicate a name (ID) of a database located within the service provider network 102 in which data from the corresponding data entity may be found. Schema 204 may indicate a name (ID) of the schema within the database 202.

Entity 206 may indicate a name (ID) of an entity, e.g., data entity, of the data. Type 208 may indicate a type of the data within the database 106, e.g., internal table, external table and view, etc.

Owner 210 may indicate a team, group, individual, personal alias, etc. that owns the data entity and the data associated therewith. This information may be provided by the owner themselves. Status 212 may indicate whether the data is active or inactive. Description 214 may indicate a purpose of the data entity.

"Last updated by" 216 may indicate the identity of the last person who updated the entity details in a data dependency and monitoring system 104 portal. If the entity was updated automatically by a data dependency and monitoring system 104 portal, then "last updated by" 216 may indicate "ddm-s_engine," e.g., an engine that automatically obtained the information, or the like. "Last updated date" 218 may indicate a timestamp of when the entity details were last updated via a data dependency and monitoring portal.

In configurations, the user interface 200 may include a search bar input 220 that may be used to search for an entity by database, schema, data entity, type, owner etc. Additionally, the user interface 200 may include a bulk update input 222 may be used to update the status 212, entity owner 210, and entity description 214 of more than one entity 206.

Also, in configurations, the user interface 200 may include an input 224 for a number of inputs to be displayed and an input 226 for indicating whether to display all entries, only active entries, or only inactive entries.

By interacting, e.g., double clicking, with the entity 206 entry of the user input 200, information may be displayed related to the selected entity 206 may be displayed on the computing device (e.g., computing device 130) of the user 118 and/or owner 114. For example, FIG. 3 schematically illustrates interactive tabs (UIs) 300 that may be displayed when an entity 206 is selected by interacting with user interface 200. The tabs may include, for example, entity details 302, e.g., specific details with respect to the selected data entity that owns the data, column details 304, e.g., specific details related to the columns of the selected data entity, downstream dependency 306, e.g., specific details related to the downstream dependencies (downstream data entity consumers 116) of the selected data entity, upstream dependency 308 e.g., specific details related to the upstream dependencies (upstream data sources 112) of the selected data entity, dashboard dependency 310 e.g., specific details related to the dashboards that depend on the selected data entity, and SQL (structured query language) 312, e.g., the SQL used by ETL platforms to obtain the data for the data entity and information relate to the data and data entity.

FIG. 4 schematically illustrates examples of information that may be displayed by selecting the entity details UI 302. The examples of information may include entity ID 402, type 404, "created by" 406, location 408, "last updated by" 410, "last update on" 412, and freshness status 414. Additional examples of information may include status 416, entity owner 418, latest refresh column 420, entity description 422, refresh start date 424, and a refresh interval 426. Further examples of information that may be displayed may include refresh interval type 428, offset days 430, alert buffer 432, and refresh time 434.

Entity ID 402 may indicate a unique ID for the selected entity 206 automatically created by the data dependency and monitoring service 104 for each entity 206. Type 404 may indicate a type of the data within the database 106, e.g., internal table, external table and view, etc.

"Created by" 406 may indicate the engine used to automatically create the selected entity 206. In configurations, "created by" 406 may indicate an individual or group that created the selected entity 206. Location 408 may indicate a path within the service provider network 102 of the external table from where data is pulled by an ETL platform.

"Last updated by" 410 may correspond to "last undated by" 216 on the entity list page of FIG. 2 and may indicate the identity of the last person who updated the entity details in a data dependency and monitoring system 104 portal. If the entity was updated automatically by a data dependency and monitoring system 104 portal, then "last updated by" 216 may indicate "XXX_engine," e.g., an engine that automatically obtained the information, or the like.

"Last update on" 412 may correspond to "last updated date" 218 on the entity list page of FIG. 2 and may indicate a timestamp of when the entity details were last updated via a data dependency and monitoring portal.

Freshness status 414 may indicate the freshness of the data. For example, the freshness status 414 may indicate delayed, stale, out of date, etc. when the data has not been refreshed within the refresh cadence. The freshness status 414 may indicate refreshed when the data has been refreshed. In configurations, the freshness status 414 may indicate "waiting" (to be refreshed). For example, the freshness status 414 may indicate "waiting" when the data has not been refreshed within the refresh cadence, but the time period is still within the threshold for refreshing the data before an alert is sent. The freshness status 414 may also indicate an amount of time since the data was last refreshed, a frequency in which the data is refreshed (e.g., every 24 hours), and/or a schedule date/time at which the date is to be refreshed in the future.

Status 416 may correspond to status 212 on the entity list page of FIG. 2 and may indicate Active or Inactive. Entity Owner 418 may correspond to owner 210 on the entity list page of FIG. 2 and may indicate a team, group, individual, personal alias, etc. that owns the data entity and the data associated therewith.

Latest refresh column 420 may indicate a date column that will trigger an engine on which to anchor the engine's data freshness. Entity description 422 may correspond to status 212 on the entity list page of FIG. 2 and may indicate a purpose of the data entity. Keywords may be included on which users 118 and/or owners 114 may search for this dataset.

Refresh start date 424 may indicate a timestamp when the entity was first refreshed. Refresh interval 426 may indicate a refresh interval, e.g., refresh cadence, by which the entity gets updated.

Refresh interval type 428 may indicate the refresh frequency of the data entity, e.g., days, hours, months, weeks, etc. Offset days 430 may be a value that may indicate by which the scheduled refresh may be offset. Alert buffer 432 may indicate the number of hours to wait before the data dependency and monitoring system may start sending alerts.

FIG. 5 schematically illustrates examples of information that may be displayed by selecting the column details UI 304 of FIG. 3. The column details UI 304 provides the metadata related to each column of the selected entity 206. The examples of information illustrated in FIG. 5 include column name 502, which may indicate a name of a column, data type 504, which may indicate a data type for the corresponding column, and column description 506, which may provide a brief description of the column. For example, the column name 502 may provide information with respect to what the data pertains to. The data type 504 may provide information as to the type of data, e.g., static, varying, dependent, etc. The column description may provide a description of the column name 502, e.g., more detail with respect to what the data pertains to.

FIG. 6 schematically illustrates examples of information that may be displayed by selecting the downstream dependency UI 306 of FIG. 3. The downstream dependency UI 306 provides all the entities, e.g., downstream data entity consumers 116, that depend on the selected entity. The downstream dependency UI 306 also provides other details, such as, for example entity name 602, entity status 604, refresh status 606, owner 608, etc., that have been previously described. A search UI 610 may also be provided for searching within the resulting records of selecting the downstream dependency UI 306.

A hierarchy level 612 may also be provided. Hierarchy level 612 indicates the level of entity hierarchy in a dependency tree. For example, consider an "entity A." All the entities depending on "entity A" are shown as level 1. The level 1 entities are "entity B", "entity C", "entity D" and "entity E". All entities depending on the above level 1 entities are shown as level 2 entities. The level 2 entities are "entity F", "entity G", and "entity H". All entities depending on the above level 2 entities would be shown as level 3 entities. Likewise, all entities depending on the level 3 entities would be shown as level 4 entities and all entities depending on the level 4 entities would be shown as level 5 entities, and so on until all dependencies are exhausted.

FIG. 7 schematically illustrates examples of information that may be displayed by selecting the upstream dependency UI 308 of FIG. 3. The upstream dependency UI 308 provides all the entities, e.g., upstream data sources 112, upon which the selected entity 206 depends. The upstream dependency UI 308 also provides other details such as, for example entity name 702, entity status 704, refresh status 706, owner 708, etc., that have been previously described.

A hierarchy level 712 may also be provided. Hierarchy level 712 indicates the level of entity hierarchy in a dependency tree. For example, consider "entity H." All entities upon which "entity H" directly depends are shown as level 1. The level 1 entities are entity B, entity C, entity D, and entity E. All entities upon which the above level 1 entities depend are shown as level 2 entities. In this example, the level 2 entity is "entity A". All entities on which the above level 2 are shown as level 3 entities. The level 3 entities are "entity X" and "entity Y". All entities on which the above level 3 entities depend would be shown as level 4 entities and all entities on which the level 4 entities depend would be shown as level 5 entities, and so on.

FIG. 8 schematically illustrates examples of information that may be displayed by selecting the dashboard dependency UI 310 of FIG. 3. The dashboard dependency UI 310 provides the list of dashboards, e.g., downstream data entity consumers 116 in the form of dashboards, that depend on the selected entity 206. The dashboard dependency UI 310 also provides the dashboard name 802, environment 804 (a project folder in a table service in the service provider network 102), status 806, owners 808a, 808b, description 810, and a link 812 to use to navigate to the dashboard within the service provider network 102. A search UI 814 may also be provided to search records related to the dashboards.

In particular, dashboard name 802 may provide a name of the dashboard and may, additionally, or alternatively, provide a unique ID of the dashboard. Environment 804 may provide an environment, e.g., a service or group with the service provider network 102, associated with the dashboard and/or where the dashboard is located. Status 806 indicates whether the dashboard is active or inactive. Owners 808a, 808b, may provide owners of the dashboard, e.g., a primary owner, a business or group owner, a technical (engineering0 owner, etc. Description 810 may provide a description of the dashboard, e.g., what the dashboard relates to. Link 812 may provide a uniform resource locator (URL) or other locator that indicates where the dashboard is located with the service provider network 102. Search UI 814 allows a user to search for various records related to the dashboard.

FIG. 9 schematically illustrates examples of information that may be displayed by selecting the SQL UI 312 of FIG. 3. In configurations, the SQL UI 312 is locked and illustrates the SQL used in the ETL job of the ETL platform that is used to generate the data for the selected entity 206. In configurations, if needed, the SQL UI 312 may be unlocked and a user 118 may save the SQL text used in the ETL job of the ETL platform that is used to generate the data for the selected entity 206 here.

As previously noted, the data dependency and monitoring system 104 described herein provides various dashboards to allow for viewing of data and the status of the data. For example, the dashboards may display the hierarchy illustrating the various levels of dependency for various data entities. The dashboards may also illustrate which data entities are up to date, e.g., the status of the data. Furthermore, updates may be provided to owners 118 and authorized users, e.g., users 124, of the dashboards.

Figure 10:
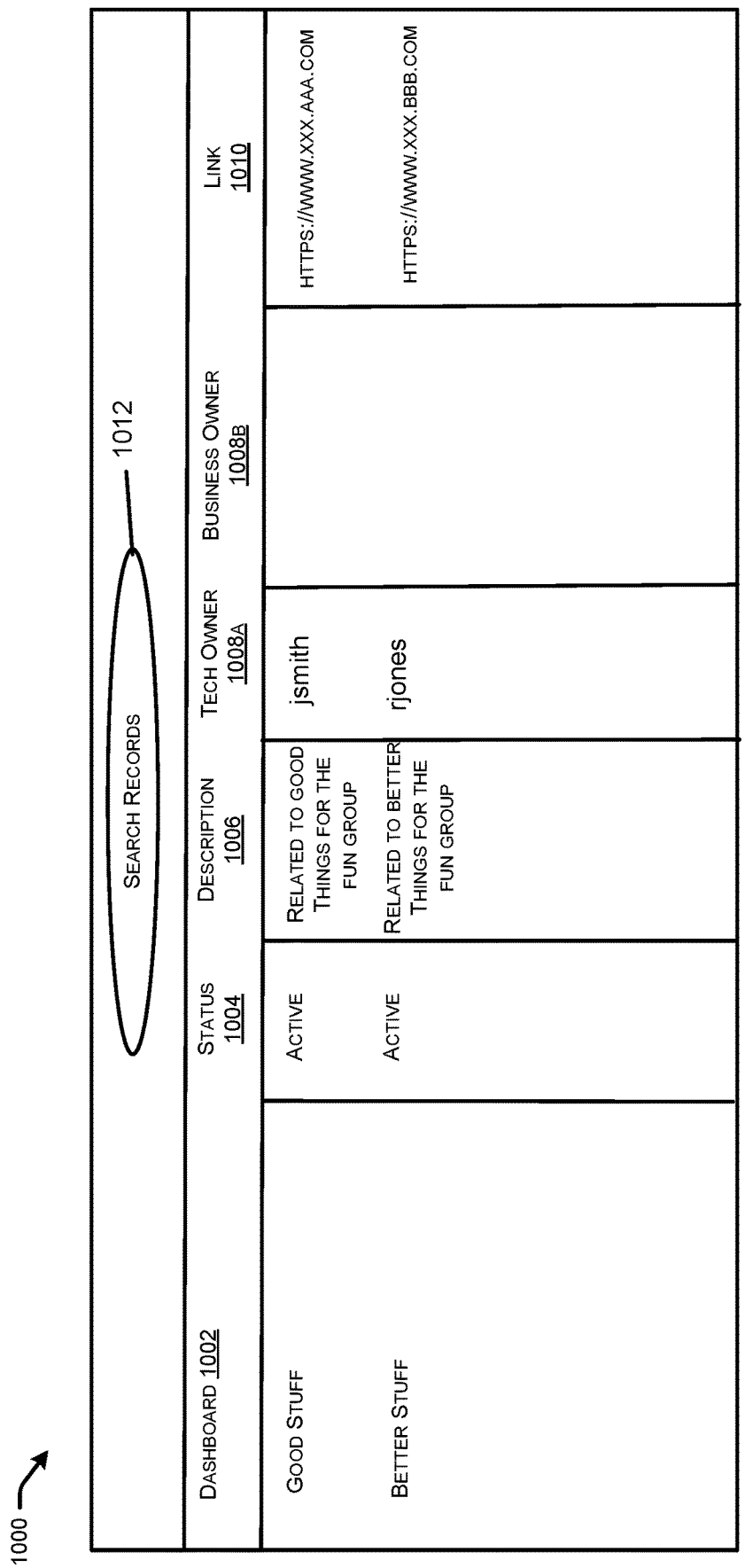
FIG. 10 schematically illustrates a user interface that may be accessed by a user and/or an owner using a computing device for accessing the database and obtaining and/or updating various pieces of information for their dashboards.

In configurations, when one or more users 118 have downstream data entity consumers 116 in the form of dashboards, a user interface for display on a computing device, e.g., computing device 130, may be provided that allows a user 118 to obtain information related to their dashboards. Referring to FIG. 10, an example of such a user interface 1000 that may be accessed by a user 118 and/or an owner 114 using a computing device, e.g., computing device 130, for accessing the database 106 and obtaining and/or updating various pieces of information for their dashboards is illustrated. The example user interface 1000 provides dashboard 1002, status 1004, description 1006, owners 1008a, 1008b, and a link 1010 to use to navigate to the dashboard within the service provider network 102. A search UI 1012 may also be provided to search records.

The dashboard 1002 provides the name of the dashboard. The status 1004 indicates whether the dashboard is active or inactive. The description 1006 provides a brief description of the dashboard. The owners 1008, 1008b provide the names of owners of the dashboard, e.g., a tech owner and a business owner. The link 1010 provides a link to navigate to the dashboard within the service provider network 102.

Figure 11:
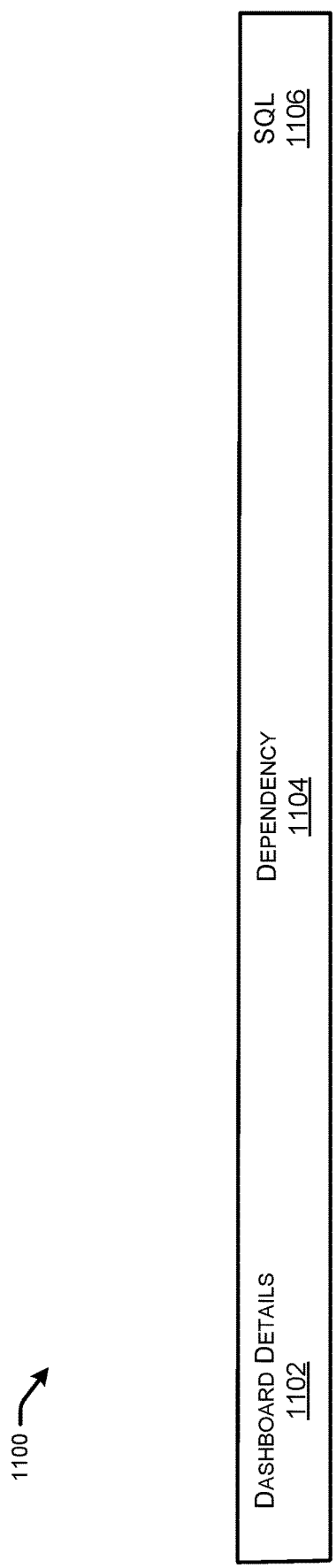
FIG. 11 schematically illustrates interactive tabs (UIs) that may be displayed when a dashboard entry is selected by interacting with a user interface of FIG. 10.

By interacting, e.g., double clicking, with the dashboard entry 1002 of the user input 1000, information may be displayed related to the selected dashboard entry 1002 may be displayed on the computing device, e.g., computing device 130, of the user 118 and/or owner 114. For example, FIG. 11 schematically illustrates interactive tabs (UIs) 1100 that may be displayed when a dashboard entry 1002 is selected by interacting with user interface 1000. The tabs may include, for example, dashboard details 1102, dependency 1104, and SQL 1106.

FIG. 12 schematically illustrates examples of information that may be displayed by selecting the dashboard details UI 1102 of FIG. 11. The examples of information may include dashboard ID 1202, "last update" 1204, "last update on" 1206, tech owner 1208 (as previously mentioned), link 1210 (as previously mentioned), "created on" 1212, type 1214, and path 1216 (as previously mentioned). Additional examples of information may include status 1218, reference link 1220, users 1222, brief description 1224, and identity of business owner 1226 (as previously mentioned), as well as any secondary owners.

Dashboard ID 1202 provides a unique ID of the selected dashboard. "Last update by" 1204 provides a date when the selected dashboard was last updated. "Last update on" 1206 provides a date when the selected dashboard was last updated. "Created on" 1212 provides the date when the selected dashboard was created. Type 1214 provides a platform on which the selected dashboard is hosted. Path 1216 provides a project folder in a table server (if any) within the network service provider 102 for the selected dashboard.

Status 1218 provides whether the selected dashboard is active, e.g., the dashboard is being used; otherwise, the selected dashboard is listed as inactive. Reference link 1220 provides the link of any references related to the selected dashboard. Users 1222 provides the users, e.g., users 118, that are using the selected dashboard. Brief description 1224 provides a brief description of the selected dashboard.

By selecting the dependency UI 1104 of FIG. 11, upstream data sources 112 (e.g., upstream data dependencies) for the entities 206 used in the selected dashboard may be displayed. For example, referring back to FIG. 7, all the entities, e.g., upstream data sources 112, upon which the entities 206 of the dashboard depend are displayed. Other details such as, for example entity name 702, entity status 704, refresh status 706, owner 708, etc., that have been previously described.

The hierarchy level 712 indicates the level of entity hierarchy in a dependency tree. All entities upon which an entity directly depends are shown as level 1. The level 1 entities are entity B, entity C, entity D, and entity E. All entities upon which the above level 1 entities depend are shown as level 2 entities. In this example, the level 2 entity is "entity A". All entities on which the above level 2 are shown as level 3 entities. The level 3 entities are "entity X" and "entity Y". All entities on which the above level 3 entities depend would be shown as level 4 entities and all entities on which the level 4 entities depend would be shown as level 5 entities, and so on. However, if an entity, e.g., "entity A", does not depend on any upstream data sources 112, that entity will be listed as "level 0."

By selecting the SQL UI 1106 of FIG. 11, the SQL code used by the ETL platform in the selected dashboard is displayed. If the dashboard consists of more than one data connection, then a drop down will be displayed with the list of all connections. A user 118 may select the connection for which the user 118 wishes to view the SQL code.

In configurations, a custom SQL UI may be used to find all upstream and downstream dependencies of any raw SQL used with the data dependency and monitoring service 104.

Figure 13:
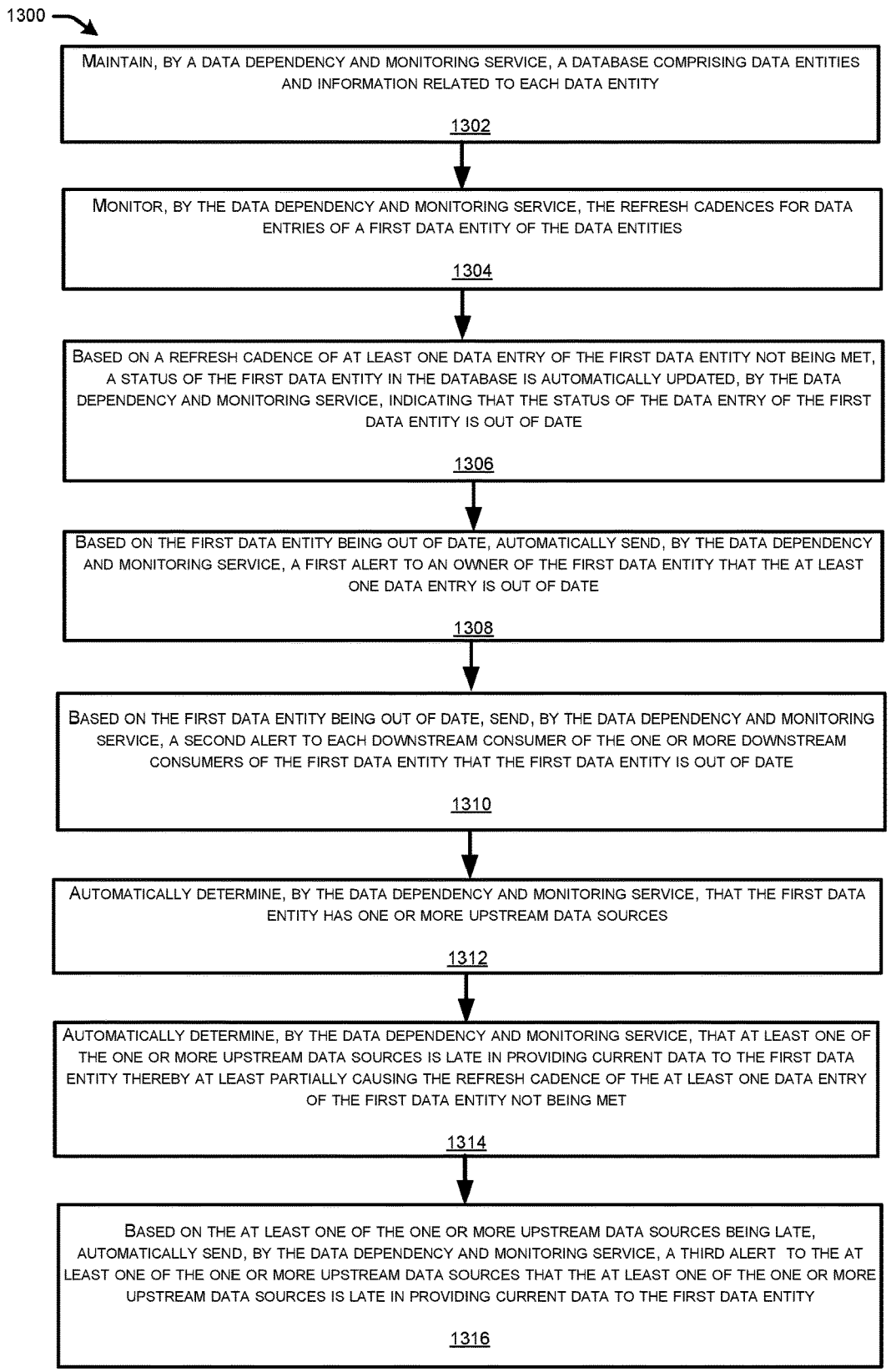
FIG. 13 a flow diagram of an example method for automatically selecting and training models for image recognition within a network.

FIG. 13 illustrates a flow diagram of an example method 1300 that illustrates aspects of the functions performed at least partly by the services as described in FIGS. 1-12. The logical operations described herein with respect to FIG. 13 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 13 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 13 illustrates a flow diagram of the example method 1300 for automatically selecting and training models for image recognition within a network. At 1302, a database comprising data entities and information related to each data entity is maintained by a data dependency and monitoring service. In configurations, the information comprises ownership of and responsibility for data entities, a refresh cadence and one or more data dependencies, wherein the refresh cadences define a periodic refresh rate for each data entry in each data entity, and wherein the one or more data dependencies define at least one of (i) one or more upstream data sources for each data entity and (ii) one or more downstream consumers of each data entity. For example, the data dependency and monitoring system 104 builds a database 106 (data dictionary) of what data is owned within service provider network 102. The information may include information about each database, e.g., each upstream data source 112, within the network such as, description, ownership, location, refresh cadence, etc. The data dependency and monitoring system also automatically determines the sources of each of the data sets, e.g., the upstream data sources 112, in the database 106. Furthermore, the data dependency and monitoring system 104 determines how the data is populated into the reports, tables, views, dashboards, etc. The database 106 may be built as a hierarchal database where levels are included within the hierarchal database to indicate various dependencies of the data. The owners 114 of the upstream data sources are also identified. It is also determined when the data is supposed to be uploaded or provided to the database 106, e.g., a refresh cadence, by the owners of the upstream data source 112.

At 1304, the refresh cadences for data entries of a first data entity of the data entities are monitored by the data dependency and monitoring service. For example, the data monitoring and alert module 110 monitors the database 106 to determine if the refresh cadence for data entities in database 106 has been met. At 1306, based on a refresh cadence of at least one data entry of the first data entity not being met, a status of the first data entity in the database is automatically updated, by the data dependency and monitoring service, indicating that the status of the data entry of the first data entity is out of date. For example, if data is supposed to be updated/refreshed at upstream data source 112a by 7:00 a.m. daily, then if the data is not refreshed/updated by 7:00 a.m. on a particular day at upstream data source 112a, the data may be labeled as stale, e.g., not up to date, etc. In configurations, there may be a threshold of, for example, 1 to 2 hours. Thus, the data may not be labeled as stale until 9:00 a.m., thereby giving the owner 114a of the upstream data source 112a a window in which to refresh/update the data after it is due. In configurations, the threshold is defined by the owner 114a of the upstream data source 114a. Thus, in configurations, the data monitoring and alert module 110 monitors the "freshness" of the data.

At 1308, based on the first data entity being out of date, a first alert is automatically sent, by the data dependency and monitoring service, to an owner of the first data entity that the at least one data entry is out of date. At 1310, based on the first data entity being out of date, a second alert is automatically sent, by the data dependency and monitoring service, to each downstream consumer of the one or more downstream consumers of the first data entity that the first data entity is out of date. For example, once the data is labeled as stale or out of date, the owner 114a of the upstream data source 112a may receive an alert 120 of the problem from the data monitoring and alert module 110. Also, users 118 who have downstream data entity consumers 116 of the data, e.g., reports, tables, views, dashboards, etc. and thus depend on the data may receive an alert 122 from the data monitoring and alert module 110 indicating that the data is not available, e.g., the data is out of date or stale. The alerts 120, 122 may be provided to groups or individuals depending on ownership of the upstream data sources 112 and/or downstream data entity consumers 116.

At 1312, it is automatically determined, by the data dependency and monitoring service, that the first data entity has one or more upstream data sources. For example, the upstream data source 112a may have an upstream data source 112x on which upstream data source 112a relies for updating its data.

At 1314, it is automatically determined, by the data dependency and monitoring service, that at least one of the one or more upstream data sources is late in providing current data to the first data entity thereby at least partially causing the refresh cadence of the at least one data entry of the first data entity not being met. For example, upstream data source 112x may be late in providing data to upstream data source 112a, thereby causing upstream data source 112a to be stale.

At 1316, based on the at least one of the one or more upstream data sources being late, a third alert is automatically sent, by the data dependency and monitoring service, to the at least one of the one or more upstream data sources that the at least one of the one or more upstream data sources is late in providing current data to the first data entity. For example, if upstream data source 112x is late in providing data to upstream data source 112a, thereby causing upstream data source 112a to be stale, then the owner, e.g., owner 112x, may receive an alert 120 that upstream data source 112x is late, e.g., out of date or stale. In configurations, the alert may not be sent to upstream data source 112x until after a predetermined threshold.

Accordingly, the techniques and architecture described herein provide a data dependency and monitoring system that shows how data flows and interacts with various systems in a data ecosystem. The data dependency and monitoring system shows mapping of data dependencies that closes the gap between data models, ensuring that it is accurate and accessible for decision makers to analyze the data. The data dependency and monitoring system not only helps users better understand their data, but the data dependency and monitoring system also allows users to monitor the data freshness and alerts data owners to make more informed decisions. With the help of the data dependency and monitoring system described herein, data owners may be aware of implications on downstream systems when data owners are changing code at source as the data dependency and monitoring system shows all the depending downstream systems that might develop issues due to the changes. The data dependency and monitoring system also gives users clear visibility and helps in identifying the root causes of application disruptions, thus saving time and effort in debugging. The data dependency and monitoring system may help determine possible failure points that might put a business at risk. With the data dependency and monitoring system described herein, data owners may have a complete view of the data infrastructure and may feel more confident about the data quality in the data warehouse. With the data dependency and monitoring system described herein, users may track how each component works with other components, thus helping teams design better data models and tools, which also helps ensure that the data is accurate before the data reaches the end user.

Figure 14:
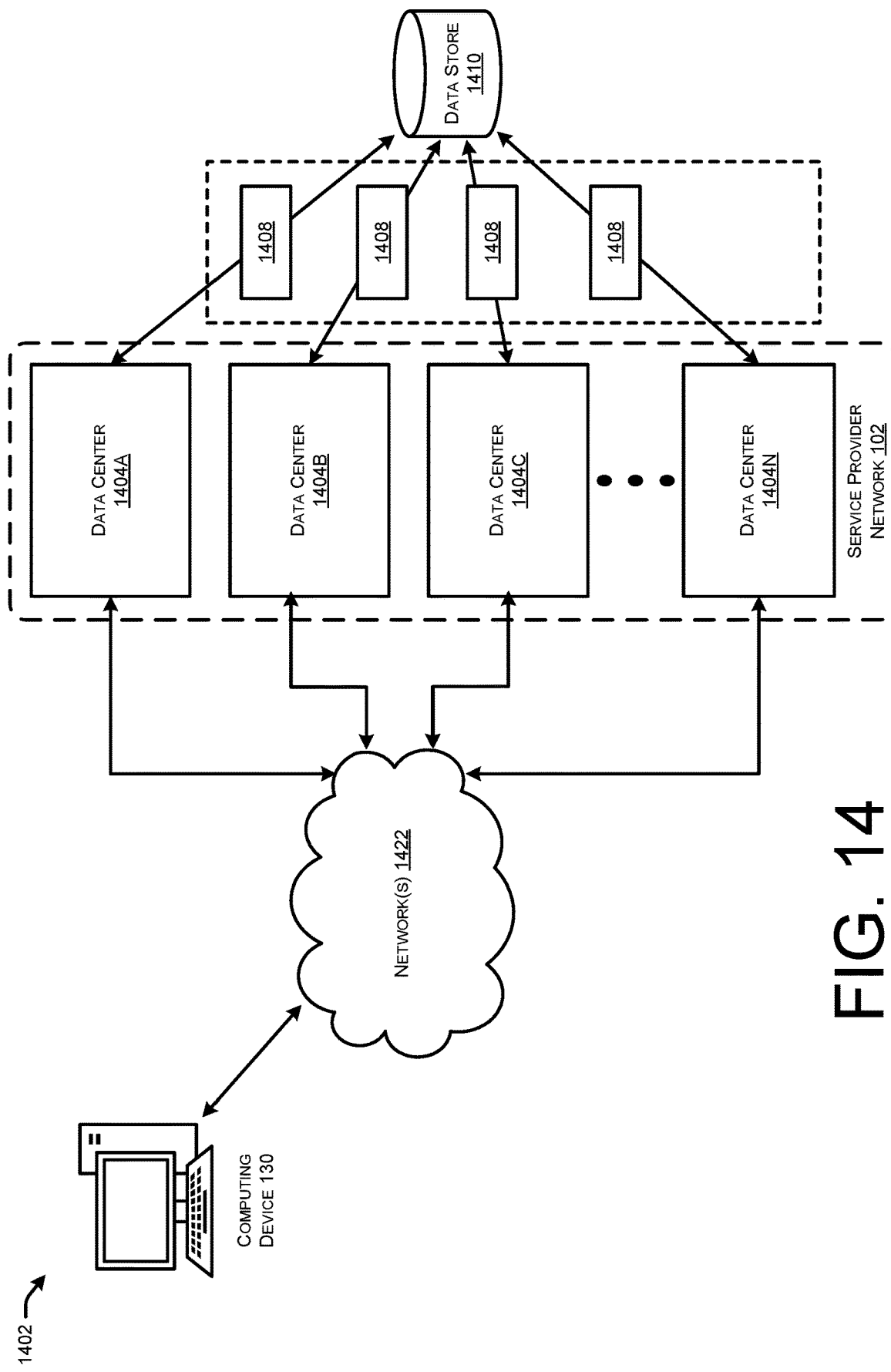
FIG. 14 is a system and network diagram that shows an illustrative operating environment that includes a service provider network that can be configured to implement aspects of the functionality described herein.

FIG. 14 is a system and network diagram that shows one illustrative operating environment 1402 for the configurations disclosed herein that includes a service provider network 102 that can be configured to perform the techniques disclosed herein and which may be accessed by a computing device 130. The service provider network 102 can provide computing resources, like VM instances and storage, on a permanent or an as-needed basis. Among other types of functionality, the computing resources provided by the service provider network 102 may be utilized to implement the various services described above such as, for example, the data dependency and monitoring service 104.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1404A-1404N (which might be referred to herein singularly as "a data center 1404" or in the plural as "the data centers 1404"). The data centers 1404 are facilities utilized to house and operate computer systems and associated components. The data centers 1404 typically include redundant and backup power, communications, cooling, and security systems. The data centers 1404 can also be located in geographically disparate locations. One illustrative embodiment for a data center 1404 that can be utilized to implement the technologies disclosed herein will be described below with regard to FIG. 14.

The data centers 1404 may be configured in different arrangements depending on the service provider network 102. For example, one or more data centers 1404 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users 118 and/or owners 114 of the service provider network 102 may access the computing resources provided by the service provider network 102 over any wired and/or wireless network(s) 1422, which can be a wide area communication network ("WAN"), such as the Internet, an intranet or an Internet service provider ("ISP") network or a combination of such networks. For example, and without limitation, a computing device, e.g., computing device 130, operated by a user 118 and/or owner 114 of the service provider network 102 may be utilized to access the service provider network 102 by way of the network(s) 1422. It should be appreciated that a local-area network ("LAN"), the Internet, or any other networking topology known in the art that connects the data centers 1404 to remote customers and other users can be utilized. It should also be appreciated that combinations of such networks can also be utilized.

Each of the data centers 1404 may include computing devices that include software, such as applications that receive and transmit data 1408. For instance, the computing devices included in the data centers 1404 may include software components which transmit, retrieve, receive, or otherwise provide or obtain the data 1408 from a data store 1410, e.g., database 106. For example, the data centers 1404 may include or store the data store 1410, which may include the data 1408.

Figure 15:
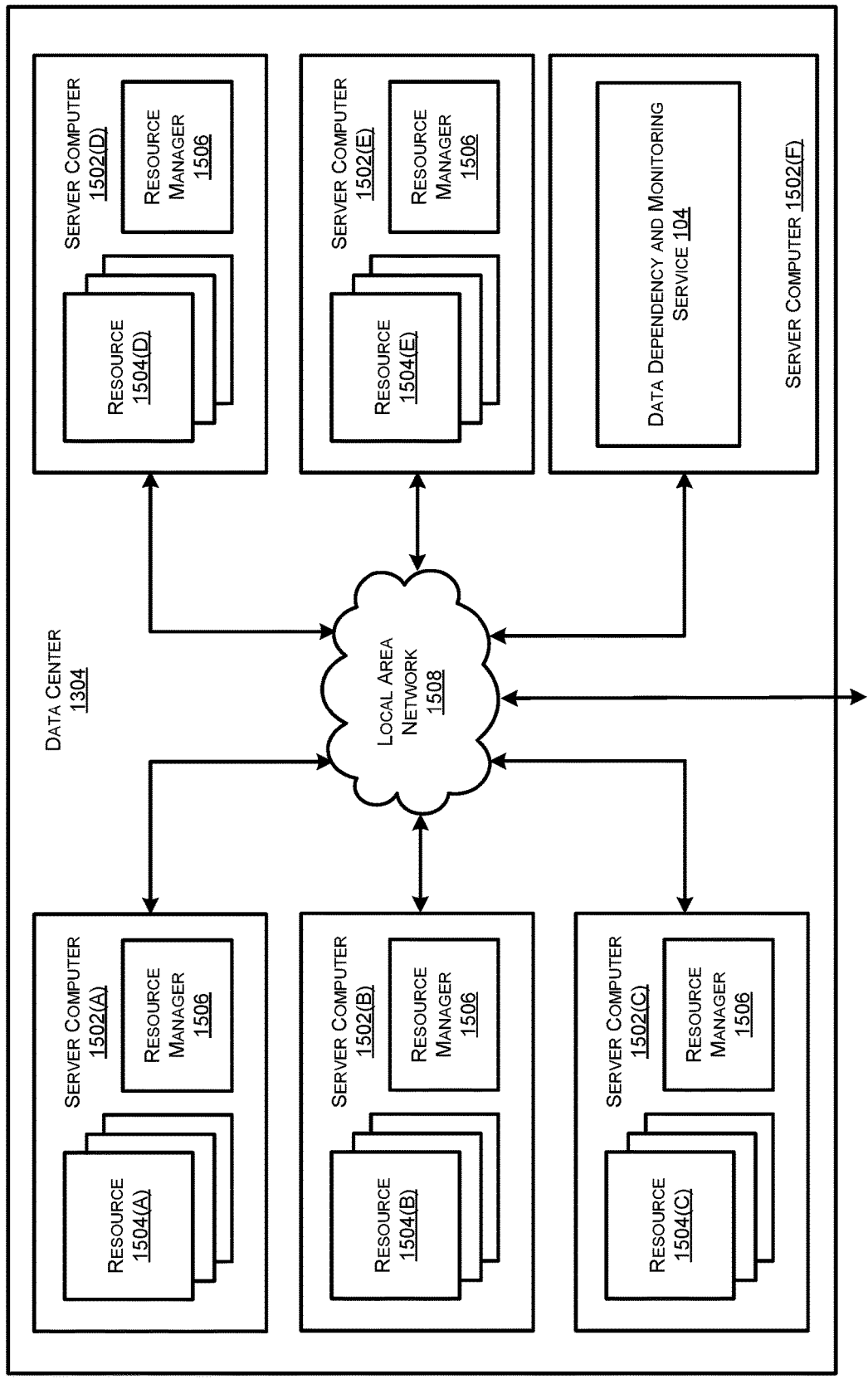
FIG. 15 is a computing system diagram illustrating a configuration for a data center that can be utilized to implement aspects of the technologies disclosed herein.

FIG. 15 is a computing system diagram that illustrates one configuration for a data center 1504 that implements aspects of the technologies disclosed herein. The example data center 1504 shown in FIG. 15 includes several server computers 1502A-1502F (which might be referred to herein singularly as "a server computer 1502" or in the plural as "the server computers 1502") for providing computing resources 1504A-1504E.

The server computers 1502 can be standard tower, rack-mount, or blade server computers configured appropriately for providing the computing resources described herein (illustrated in FIG. 15 as the computing resources 1504A-1504E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1502 can also be configured to execute a resource manager 1506 capable of instantiating and/or managing the computing resources. In the case of VM instances, for example, the resource manager 1506 can be a hypervisor or another type of program configured to enable the execution of multiple VM instances on a single server computer 1502. Server computers 1502 in the data center 1504 can also be configured to provide network services and other types of services, some of which are described in detail below with regard to FIG. 16.

The data center 1504 shown in FIG. 15 also includes a server computer 1502F that can execute some or all of the software components described above. For example, and without limitation, the server computer 1502F can be configured to execute components of the service provider network 102, including the data dependency and monitoring service 104, and/or the other software components described above. The server computer 1502F can also be configured to execute other components and/or to store data for providing some or all of the functionality described herein. In this regard, it should be appreciated that the services illustrated in FIG. 15 as executing on the server computer 1502F can execute on many other physical or virtual servers in the data centers 1504 in various embodiments.

In the example data center 1504 shown in FIG. 15, an appropriate LAN 1508 is also utilized to interconnect the server computers 1502A-1502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1504A-1504N, between each of the server computers 1502A-1502F in each data center 1504, and, potentially, between computing resources in each of the server computers 1502. It should be appreciated that the configuration of the data center 1504 described with reference to FIG. 15 is merely illustrative and that other implementations can be utilized.

Figure 16:
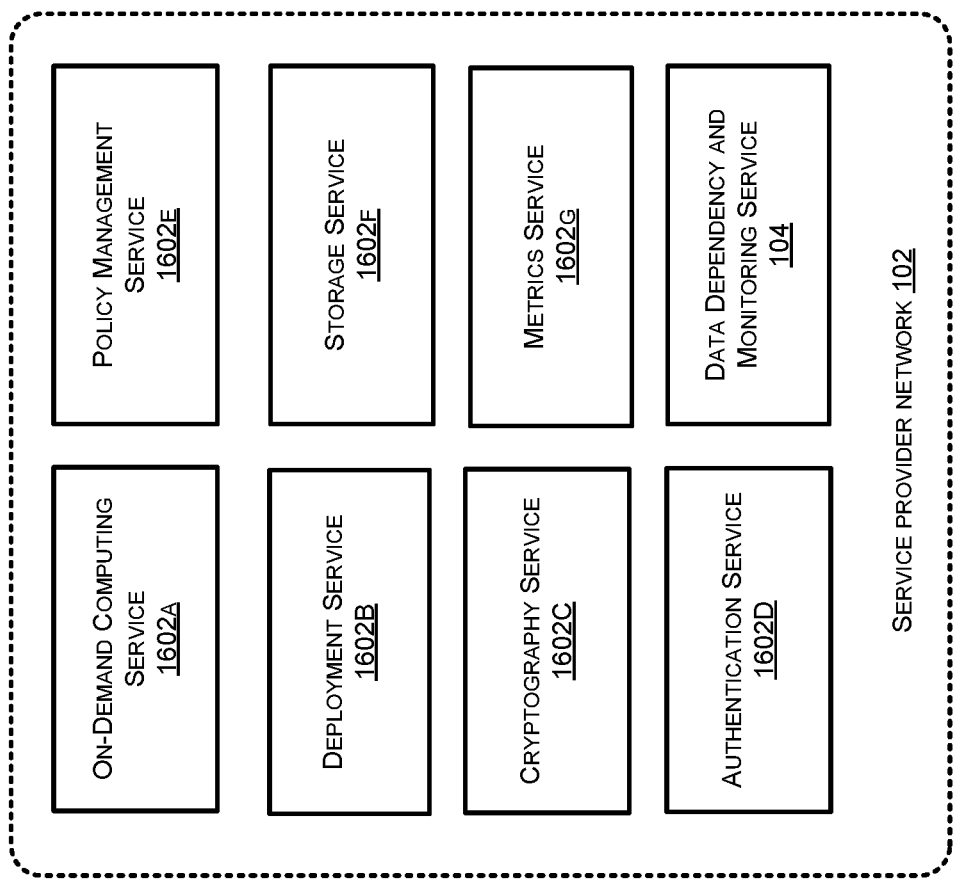
FIG. 16 is a network services diagram that shows aspects of several services that can be provided by and utilized within a system, or a larger system of which the system is a part, which is configured to implement the various technologies disclosed herein.

FIG. 16 is a system and network diagram that shows aspects of several network services that can be provided by and utilized within a service provider network 102 in one embodiment disclosed herein. In particular, and as discussed above, the service provider network 102 can provide a variety of network services to users 118 and/or owners 114 within the service provider network 102, as well as customers, including, but not limited to, the data dependency and monitoring service 104. The service provider network 102 can also provide other types of services including, but not limited to, an on-demand computing service 1602A, a deployment service 1602B, a cryptography service 1602C, a storage service 1602D, an authentication service 1602E, and/or a policy management service 1602G, some of which are described in greater detail below. Additionally, the service-provider network 102 can also provide other services, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 1422 shown in FIG. 14. Communications from a customer computing device, such as the computing device 130 shown in FIG. 14, to the service provider network 102 can cause the services provided by the service provider network 102 to operate in accordance with the described configurations or variations thereof.

It is noted that not all embodiments described include the services described with reference to FIG. 16 and that additional services can be provided in addition to or as an alternative to services explicitly described. Each of the services shown in FIG. 16 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 1602A to store data in or retrieve data from a storage service). Additional details regarding some of the services shown in FIG. 16 will now be provided.

As discussed above, the on-demand computing service 1602A (can be a collection of computing resources configured to instantiate VM instances and to provide other types of computing resources on demand. For example, a customer or other user of the service provider network 102 can interact with the on-demand computing service 1602A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 1602A is shown in FIG. 16, any other computer system or computer system service can be utilized in the service provider network 102, such as a computer system or computer system service that does not employ virtualization and instead provisions computing resources on dedicated or shared computers/servers and/or other physical devices.

The service provider network 102 can also include a cryptography service 1602C. The cryptography service 1602C can utilize storage services of the service provider network 102, such as the storage service 104, to store encryption keys in encrypted form, whereby the keys are usable to decrypt customer keys accessible only to particular devices of the cryptography service 1602C. The cryptography service 1602C can also provide other types of functionality not specifically mentioned herein.

As illustrated in FIG. 16, the service provider network 102, in various embodiments, also includes an authentication service 1602D and a policy management service 1602E. The authentication service 1602D, in one example, is a computer system (i.e., collection of computing resources) configured to perform operations involved in authentication of users. For instance, one of the services 1602 shown in FIG. 16 can provide information from a user to the authentication service 1602D to receive information in return that indicates whether or not the requests submitted by the user are authentic.

The policy management service 1602E, in one example, is a network service configured to manage policies on behalf of customers or internal users of the service provider network 102. The policy management service 1602E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

A storage service 1602F can include software and computing resources that collectively operate to store data using block or file-level storage devices (and/or virtualizations thereof) into a data store, which may be part of the storage service 702D. The storage devices of the storage service 1602F for instance, be operationally attached to virtual computer systems provided by the on-demand computing service 1602A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can additionally maintain other services 1602 based, at least in part, on the needs of its customers. For instance, the service provider network 102 can maintain a deployment service 1602B for deploying program code and/or a data warehouse service in some embodiments and a metrics service 1602G. Other services can include object-level archival data storage services, database services, and services that manage, monitor, interact with, or support other services. The service provider network 102 can also be configured with other services not specifically mentioned herein in other embodiments.

Figure 17:
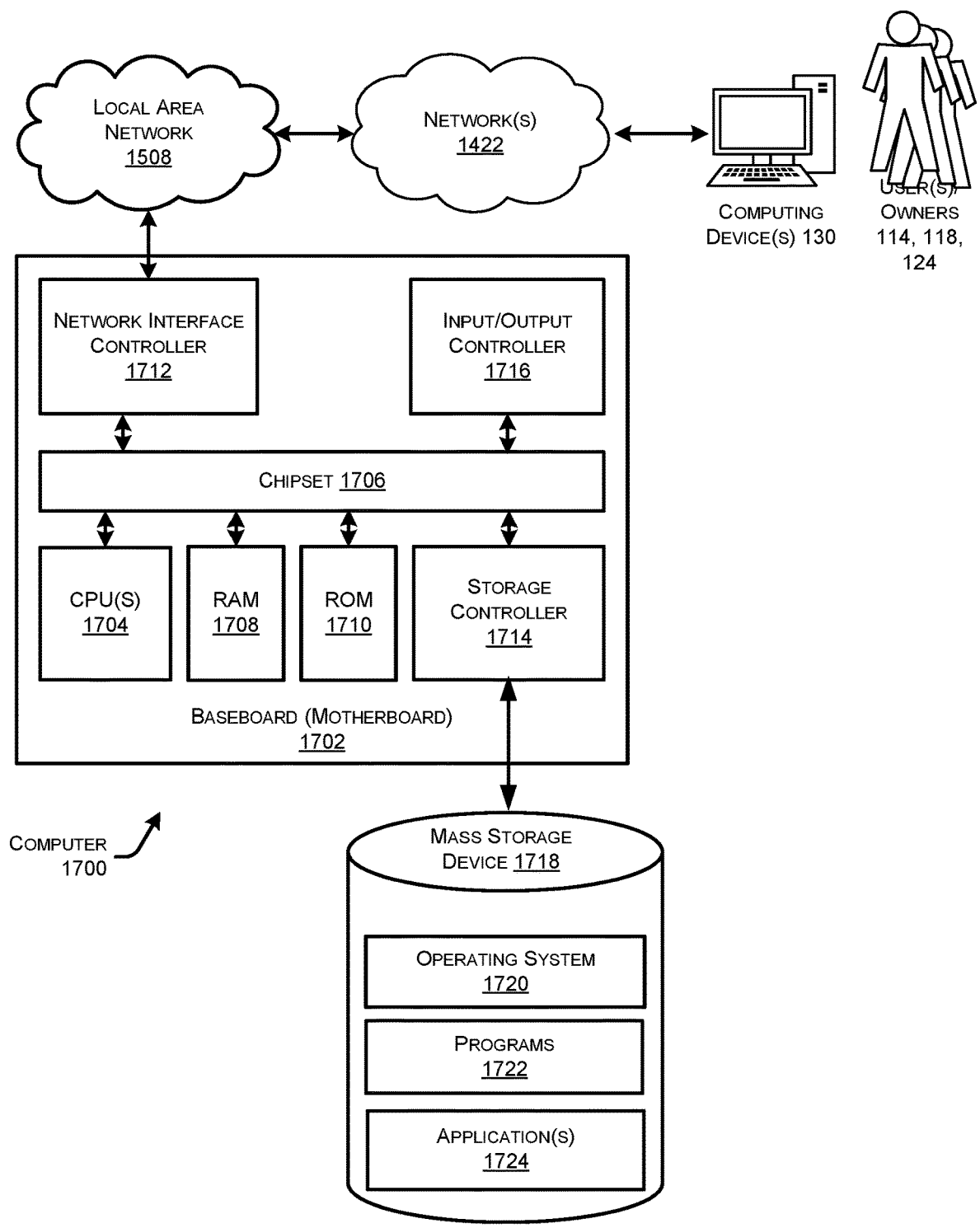
FIG. 17 is a computer architecture diagram showing an illustrative computer hardware architecture for implementing a computing device that can be utilized to implement aspects of the various technologies presented herein.

FIG. 17 shows an example computer architecture for a computer 1700 capable of executing program components for implementing the functionality described above. The computer architecture shown in FIG. 17 illustrates a server computer, workstation, desktop computer, laptop, tablet, network appliance, e-reader, smartphone, or other computing device, and can be utilized to execute any of the software components presented herein.

The computer 1700 includes a baseboard 1702, or "motherboard," which is a printed circuit board to which a multitude of components or devices can be connected by way of a system bus or other electrical communication paths. In one illustrative configuration, one or more central processing units ("CPUs") 1704 operate in conjunction with a chipset 1706. The CPUs 1704 can be standard programmable processors that perform arithmetic and logical operations necessary for the operation of the computer 1700.

The CPUs 1704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1706 provides an interface between the CPUs 1704 and the remainder of the components and devices on the baseboard 1702. The chipset 1706 can provide an interface to a RAM 1708, used as the main memory in the computer 1700. The chipset 1706 can further provide an interface to a computer-readable storage medium such as a read-only memory ("ROM") 1710 or non-volatile RAM ("NVRAM") for storing basic routines that help to startup the computer 1700 and to transfer information between the various components and devices. The ROM 1710 or NVRAM can also store other software components necessary for the operation of the computer 1700 in accordance with the configurations described herein.

The computer 1700 can operate in a networked environment using logical connections to remote computing devices and computer systems through a network, such as the network 1408. The chipset 1706 can include functionality for providing network connectivity through a Network Interface Controller (NIC) 1712, such as a gigabit Ethernet adapter. The NIC 1712 is capable of connecting the computer 1700 to other computing devices over the network 1508 (or 1422). It should be appreciated that multiple NICs 1712 can be present in the computer 1700, connecting the computer to other types of networks and remote computer systems.

The computer 1700 can be connected to a mass storage device 1718 that provides non-volatile storage for the computer. The mass storage device 1718 can store an operating system 1720, programs 1722 (e.g., agents, etc.), data, and/or applications(s) 1724, which have been described in greater detail herein. The mass storage device 1718 can be connected to the computer 1700 through a storage controller 1714 connected to the chipset 1706. The mass storage device 1718 can consist of one or more physical storage units. The storage controller 1714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1700 can store data on the mass storage device 1718 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 1718 is characterized as primary or secondary storage, and the like.

For example, the computer 1700 can store information to the mass storage device 1718 by issuing instructions through the storage controller 1714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1700 can further read information from the mass storage device 1718 by detecting the physical states or characteristics of one or more particular locations within the physical storage units.

In addition to the mass storage device 1718 described above, the computer 1700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1700. In some examples, the operations performed by the service provider network 102, and or any components included therein, may be supported by one or more devices similar to computer 1700. Stated otherwise, some or all of the operations performed by the service provider network 102, and or any components included therein, may be performed by one or more computer devices 1700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1718 can store an operating system 1720 utilized to control the operation of the computer 1700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 1718 can store other system or application programs and data utilized by the computer 1700.

In one embodiment, the mass storage device 1718 or other computer-readable storage media is encoded with computer-executable instructions which, when loaded into the computer 1700, transform the computer from a general-purpose computing system into a special-purpose computer capable of implementing the embodiments described herein. These computer-executable instructions transform the computer 1700 by specifying how the CPUs 1704 transition between states, as described above. According to one embodiment, the computer 1700 has access to computer-readable storage media storing computer-executable instructions which, when executed by the computer 1700, perform the various processes described above with regard to FIGS. 1-13. The computer 1700 can also include computer-readable storage media having instructions stored thereupon for performing any of the other computer-implemented operations described herein.

The computer 1700 can also include one or more input/output controllers 1716 for receiving and processing input from a number of input devices, such as a keyboard, a mouse, a touchpad, a touch screen, an electronic stylus, or other type of input device. Similarly, an input/output controller 1716 can provide output to a display, such as a computer monitor, a flat-panel display, a digital projector, a printer, or other type of output device. It will be appreciated that the computer 1700 might not include all of the components shown in FIG. 17, can include other components that are not explicitly shown in FIG. 17, or might utilize an architecture completely different than that shown in FIG. 17.

The computer 1700 may transmit, receive, retrieve, or otherwise provide and/or obtain data and/or results to and/or from the service provider network 102. The computer 1700 may store the data on the operating system 1720, and/or the programs 1722 that are stored in the mass storage device 1718 to update or otherwise modify the operating system 1720 and/or the programs 1722.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:

maintaining, by a data dependency and monitoring service, a database comprising data entities and information related to each data entity of the data entities, wherein the information comprises ownership of and responsibility for data entities, a refresh cadence, and one or more data dependencies, wherein the refresh cadences define a periodic refresh rate for each data entry in each data entity, and wherein the one or more data dependencies define at least one of (i) one or more upstream data sources for each data entity and (ii) one or more downstream consumers of each data entity;

monitoring, by the data dependency and monitoring service, the refresh cadences for data entries of a first data entity of the data entities;

based on a refresh cadence of at least one data entry of the first data entity being unsatisfied, automatically updating, by the data dependency and monitoring service, a status of the first data entity in the database indicating that the at least one data entry of the first data entity is out of date;

based on the at least one data entry of the first data entity being out of date, automatically sending, by the data dependency and monitoring service, a first alert to an owner of the first data entity that the at least one data entry is out of date; and based on the at least one data entry of the first data entity being out of date, automatically sending, by the data dependency and monitoring service, a second alert to each downstream consumer of the first data entity that the first data entity is out of date.

2. The computer-implemented method of claim 1, further comprising:

automatically determining, by the data dependency and monitoring service, that the first data entity has one or more of the one or more upstream data sources;

automatically determining, by the data dependency and monitoring service, that at least one of the one or more upstream data sources is late in providing current data to the first data entity thereby at least partially causing the refresh cadence of the at least one data entry of the first data entity to be unsatisfied; and based on the at least one of the one or more upstream data sources being late, automatically sending, by the data dependency and monitoring service, a third alert to the at least one of the one or more upstream data sources that the at least one of the one or more upstream data sources is late in providing the current data to the first data entity.

3. The computer-implemented method of claim 1, wherein at least one of (i) sending the first alert or (ii) sending the second alert is delayed by a predetermined amount of time after determining that the refresh cadence of the first data entity is unsatisfied.

4. The computer-implemented method of claim 1, further comprising:
  receiving a subscription from a user for receiving alerts for the status for the first data entity; and
  based on the refresh cadence of the first data entity being unsatisfied, sending a third alert to the user that the first data entity is out of date.

5. A method comprising:
  monitoring refresh cadences for data entries, located in a database, of a data entity, wherein the refresh cadences define a periodic refresh rate for data entries of the data entity;
  based at least in part on a refresh cadence of at least one data entry of the data entity being unsatisfied, automatically updating a status of the data entity in the database indicating that the at least one data entry of the data entity is out of date; and
  based at least in part on the at least one data entry of the data entity being out of date, sending a first alert to an owner of the data entity that the at least one data entry is out of date.

6. The method of claim 5, further comprising:
  sending a second alert to one or more downstream consumers of the data entity that the data entity is out of date.

7. The method of claim 5, further comprising:
  determining an upstream data source for the at least one data entry; and
  based at least in part on the at least one data entry of the data entity being out of date, sending a second alert to the upstream data source that data for the at least one data entry is late.

8. The method of claim 7, wherein sending the second alert is delayed by a predetermined amount of time after automatically updating the status of the data entity in the database indicating that the data entity is out of date.

9. The method of claim 8, wherein the predetermined amount of time is defined by an owner of the upstream data source.

10. The method of claim 8, wherein sending the first alert is delayed by the predetermined amount of time after automatically updating the status of the data entity in the database indicating that the data entity is out of date.

11. The method of claim 5, further comprising:
  receiving a subscription from a user for receiving alerts for the status for the data entity; and
  based at least in part on updating the status of the data entity in the database indicating that the status of the at least one data entry of the data entity is out of date, sending a third alert to the user that the data entity is out of date.

12. The method of claim 5, further comprising:
  determining a data entry of the data entity has not been updated for a predetermined amount of time; and
  labeling the data entry of the data entity as invalid.

13. The method of claim 12, further comprising:
  searching, by a downstream consumer of the data entity, whether any data entries of the data entity are invalid.

14. The method of claim 5, further comprising:
  based at least in part on the at least one data entry of the data entity being out of date, periodically attempting to obtain current data for the at least one data entry of the data entity.

15. One or more computer-readable media storing computer-executable instructions that, when executed, cause one or more processors to perform operations comprising:
  monitoring refresh cadences for data entries, located in a database, of a data entity, wherein the refresh cadences define a periodic refresh rate for data entries of the data entity;
  based at least in part on a refresh cadence of at least one data entry of the data entity being unsatisfied, automatically updating a status of the data entity in the database indicating that the at least one data entry of the data entity is out of date; and
  based at least in part on the at least one data entry of the data entity being out of date, sending a first alert to an owner of the data entity that the at least one data entry is out of date.

16. The one or more computer-readable media of claim 15, further comprising:
  sending a second alert to one or more downstream consumers of the data entity that the data entity is out of date.

17. The one or more computer-readable media of claim 15, wherein the operations further comprise:
  determining an upstream data source for the at least one data entry; and
  based at least in part on the at least one data entry of the data entity being out of date, sending a second alert to the upstream data source that data for the at least one data entry is late.

18. The one or more computer-readable media of claim 15, wherein the operations further comprise:
  receiving a subscription from a user for receiving alerts for the status for the data entity; and
  based at least in part on updating the status of the data entity in the database indicating that the status of the at least one data entry of the data entity is out of date, sending a third alert to the user that the data entity is out of date.

19. The one or more computer-readable media of claim 15, wherein the operations further comprise:
  determining at least one data entry of the data entity has not been updated for a predetermined amount of time; and
  labeling the at least one data entry of the data entity as invalid.

20. The one or more computer-readable media of claim 15, wherein the operations further comprise:
  based at least in part on the at least one data entry of the data entity being out of date, periodically attempting to obtain current data for the at least one data entry of the data entity.

* * * * *